United States Patent
Shimizu

(10) Patent No.: US 9,411,450 B2
(45) Date of Patent: Aug. 9, 2016

(54) DISPLAY INPUT DEVICE, IMAGE FORMING APPARATUS, AND CONTROL METHOD OF DISPLAY INPUT DEVICE

(71) Applicant: KYOCERA Document Solutions Inc., Osaka (JP)

(72) Inventor: Takeo Shimizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 21 days.

(21) Appl. No.: 14/539,655

(22) Filed: Nov. 12, 2014

(65) Prior Publication Data

US 2015/0145793 A1    May 28, 2015

(30) Foreign Application Priority Data

Nov. 28, 2013  (JP) ................................. 2013-245621

(51) Int. Cl.
  *G06F 3/0488* (2013.01)
  *G06F 3/041* (2006.01)
  *G06F 3/0482* (2013.01)
  *G06F 3/0483* (2013.01)

(52) U.S. Cl.
  CPC .............. *G06F 3/041* (2013.01); *G06F 3/0482* (2013.01); *G06F 3/0483* (2013.01); *G06F 3/0488* (2013.01); *G06F 3/04886* (2013.01)

(58) Field of Classification Search
  CPC ... G06F 3/0482; G06F 3/041; G06F 3/04886; G06F 3/0483
  See application file for complete search history.

(56) References Cited

U.S. PATENT DOCUMENTS

| | | | |
|---|---|---|---|
| 8,532,596 | B1 | 9/2013 | Park ............................ 455/158.4 |
| 2008/0184171 | A1 | 7/2008 | Sato et al. ...................... 715/841 |
| 2010/0178909 | A1* | 7/2010 | Kim .................... G06F 3/04817 |
| | | | 455/418 |
| 2011/0030050 | A1 | 2/2011 | Fukushima et al. ............. 726/16 |
| 2011/0050601 | A1* | 3/2011 | Son ..................... G06F 3/04883 |
| | | | 345/173 |
| 2012/0233573 | A1 | 9/2012 | Sullivan et al. ............... 715/848 |
| 2013/0154968 | A1* | 6/2013 | Tomimori ............. G06F 1/1616 |
| | | | 345/173 |
| 2013/0194378 | A1 | 8/2013 | Brown ....................... 348/14.09 |

FOREIGN PATENT DOCUMENTS

| | | |
|---|---|---|
| EP | 2 662 761 A1 | 11/2013 |
| JP | 10-105356 A | 4/1998 |
| JP | 2002-312105 A | 10/2002 |
| JP | 2013-131114 A | 7/2013 |

\* cited by examiner

*Primary Examiner* — Shaheda Abdin
(74) *Attorney, Agent, or Firm* — Stein IP, LLC

(57) ABSTRACT

A display input device includes a display unit, a touch panel unit for accepting an operation on a button displayed on the display unit. When the touch panel unit accepts a predetermined first operation, the display unit performs a list display of a predetermined or smaller number of reduced screens in order from the higher layer screen, each of which is smaller than a screen in the normal mode and is selected so as to move toward a lower layer one by one from a next lower layer screen of the screen on which the first operation is made.

12 Claims, 14 Drawing Sheets

FIG.9

| Guest/Permission Information | | | | 11,12 |
|---|---|---|---|---|
| Box Storage Restriction<br>Disabled To Use | Change > | External Memory Storage Restriction<br>Disabled To Use | Change > | |
| Copy Print Restriction<br>Not Restricted | Change > | Copy Print Restriction (Color)<br>Disabled To Use | Change > | |
| Copy Print Restriction (Full Color)<br>Disabled To Use | Change > | Printer Print Restriction<br>Disabled To Use | Change > | |
| Printer Print Restriction (Color)<br>Disabled To Use | Change > | Transmission Restriction<br>Disabled To Use | Change > | B9 |
| Fax Transmission Restriction<br>Disabled To Use | Change > | | | 55 |

Cancel (B13)  Return (B14)

Transmission Restriction — 11,12

Not Set (B11)   Set (B10)

Cancel (B13)  Ok (B12)  Return (B14)

User Management

User Management
Local Authentication [Change >] — B2

Local User List [Register/Edit >] — B3
Guest Permission Setting [Change >] — B5
— C5, B4

B13 B14
[Cancel] [Return]     2015/11/5   15:15

Guest Permission

Guest Permission
Permit [Change >] — B6

Guest Property [Change >] — B7
— C5

B13 B14
[Cancel] [Return]     2015/11/5   15:15

Guest Property

User Name
01 User [Change >]

Login User Name
0099 [Change >]

Access Level
User [Change >]

Mail Address [Change >]

Department Name
02 Department [Change >]

Permission Information [Change >] — B8
— C5

B13 B14
[Cancel] [Return]     2015/11/5   15:15

Guest/Permission Information

Box Storage Restriction
Disabled To Use [Change >]

External Memory Storage Restriction
Disabled To Use [Change >]

Copy Print Restriction
Not Restricted [Change >]

Printer Print Restriction
Disabled To Use [Change >]

Copy Print Restriction (Full Color)
Disabled To Use [Change >]

Transmission Restriction
Disabled To Use [Change >] — B9

Printer Print Restriction (Color)
Disabled To Use [Change >]

Fax Transmission Restriction
Disabled To Use [Change >]

B13 B14
[Cancel] [Return]     2015/11/5   15:15

— 11, 12
— 52, 53, 54, 55

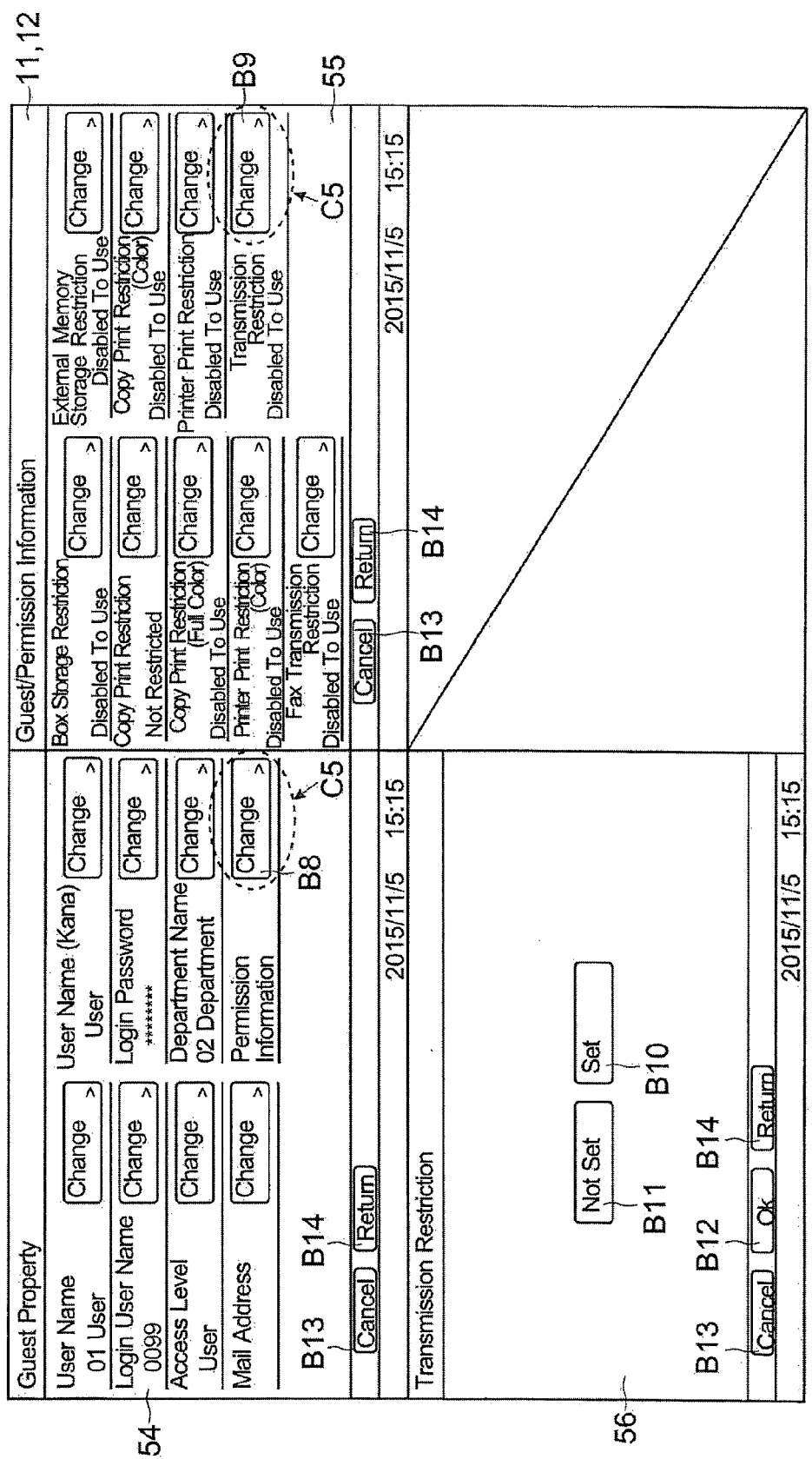

DISPLAY INPUT DEVICE, IMAGE FORMING APPARATUS, AND CONTROL METHOD OF DISPLAY INPUT DEVICE

CROSS-REFERENCE TO RELATED APPLICATIONS

This application is based upon and claims the benefit of priority from the corresponding Japanese Patent Application No. 2013-245621 filed Nov. 28, 2013, the entire contents of which are incorporated herein by reference.

BACKGROUND OF THE INVENTION

The present disclosure relates to a display input device including a display unit and a touch panel. In addition, the present disclosure relates to an image forming apparatus including this display input device.

The display input device may be attached to an apparatus or equipment. The display input device enables setting and input of characters. Further, because the number of hardware keys arranged on a cellular phone terminal or the like is limited, a plurality of roles (meanings) may be assigned to one key. Therefore, a process assigned to a key in a current state may be unknown resulting in an input error or an increase of the number of times of pressing keys. In order to prevent this deterioration of operability, there is known the following technique.

Specifically, there is known an input device equipped with an input unit for inputting a press of a key as an execution instruction of a process assigned to the key, a long press detection unit for detecting a long press state in which a key is continuously pressed, and an informing unit for informing a user of a process assigned to the key while inhibiting an input by the input unit when the long press state of the key is detected. With this structure, it is aimed to enable the user to easily check a process assigned to each key.

An image forming apparatus such as a copier, a multifunction peripheral, a printer, or a FAX apparatus may also be equipped with a display input device (which may be referred to also as an "operation panel"). Further, the operation panel of the image forming apparatus displays a screen for selecting a set item or for setting a set value. Because there are many selectable set items and settable set values, a plurality of (many) types of screens are prepared.

Specifically, when a user wants to set a certain set value, a highest layer screen in a hierarchical structure is displayed first. Then, a button (key) for selecting a set item (classification or category) is operated on the screen (a display position thereof is touched) so that a next layer (next lower layer) screen is displayed. Further, as necessary, a button that can lead to a desired screen among buttons in the screen after the switching (buttons for selecting further lower layer set items) is operated. Then, the screen further moves to a next lower layer. Such button selection is repeated until reaching a desired screen. In other words, in order to reach a desired screen, it is required to repeat the operation on buttons so as to trace an appropriate path toward a lower layer screen one by one. In this way, displays on the operation panel have a hierarchical structure (or a tree structure).

Conventionally, in order to switch the display screen, it is necessary to actually operate a button in the screen. In other words, the screen is not switched unless a display position of a button is not touched. Therefore, in order to check a lower layer screen apart by a plurality of layers, it is necessary to actually press buttons in screens a plurality of times so as to switch the screen. Therefore, there is a problem that it is difficult to easily check which screen belongs toward a lower layer. In particular, a screen belonging to a layer lower than the current layer apart by two or more layers cannot be checked by one operation, and needs to repeat operation of a plurality of buttons to check repeatedly. In addition, when the switched screen is not a desired screen, an operation to return to the original screen is required. Therefore, there is a case where a long time and many operations are necessary to reach a desired screen for setting a set value.

In addition, in order to complete setting of the image forming apparatus, it may be necessary to move toward a lower layer screen apart by many layers (for setting about system, for example). In this case, screen transition (switch toward a lower layer screen) is repeated. In addition, there is a case where because a desired screen is in a deep layer, a path to the desired screen cannot be easily found, and transition to an incorrect screen and returning operation are repeated. In addition, there is also a problem that repetition of the screen switching and the returning operation may make it difficult to understand which layer is the current layer.

Here, in the cellular phone terminal described above, a function (process) assigned to the long-pressed key is displayed. However, though the assigned function is displayed, a screen to be displayed cannot be checked unless a button is actually pressed. In addition, in order to move the layers of display screens, it is necessary to operate a button every time, and a screen apart by a plurality of layers cannot be checked by one operation. In addition, repetition of pressing an incorrect key and returning operation afterwards may make it difficult to understand which layer is the current layer.

SUMMARY OF THE INVENTION

The present disclosure is made in view of the problem of the conventional technique described above. A display input device according to a first aspect of the present disclosure includes a display unit configured to display a button in a screen and to switch a screen to be displayed from a screen that is currently displayed to one of a lower layer screen and an higher layer screen in accordance with a button that is operated in a normal mode, and a touch panel unit for accepting an operation on the screen of the display unit and for accepting an operation on the button displayed on the display unit. Further, when the touch panel unit accepts a predetermined first operation, the display unit starts a display in a list display mode, in which a predetermined or smaller number of reduced screens are displayed in a list display in order from the higher layer screen, each of which is smaller than a screen in the normal mode and is selected so as to move toward a lower layer one by one from a next lower layer screen of the screen on which the first operation is made.

Further features and advantages of the present invention will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 9 is a diagram showing an example of a screen displayed on the operation panel according to the embodiment.

FIG. 10 is a diagram showing an example of a screen displayed on the operation panel according to the embodiment.

FIG. 15 is a diagram showing an example of a list display on the operation panel according to the embodiment.

FIG. 19 is a diagram showing an example of switching by a specified operation on the list display screen of the operation panel according to the embodiment.

DETAILED DESCRIPTION OF THE EMBODIMENTS

An embodiment of the present disclosure is described with reference to FIGS. 1 to 19. Here, an operation panel 1 (corresponding to the display input device) included in a multifunction peripheral 100 (corresponding to the image forming apparatus) is exemplified and described. However, elements such as structures and layouts described in this embodiment do not limit the scope of the disclosure and are merely examples for description.

(Schematic Structure of Multifunction Peripheral 100)

Figure 1:
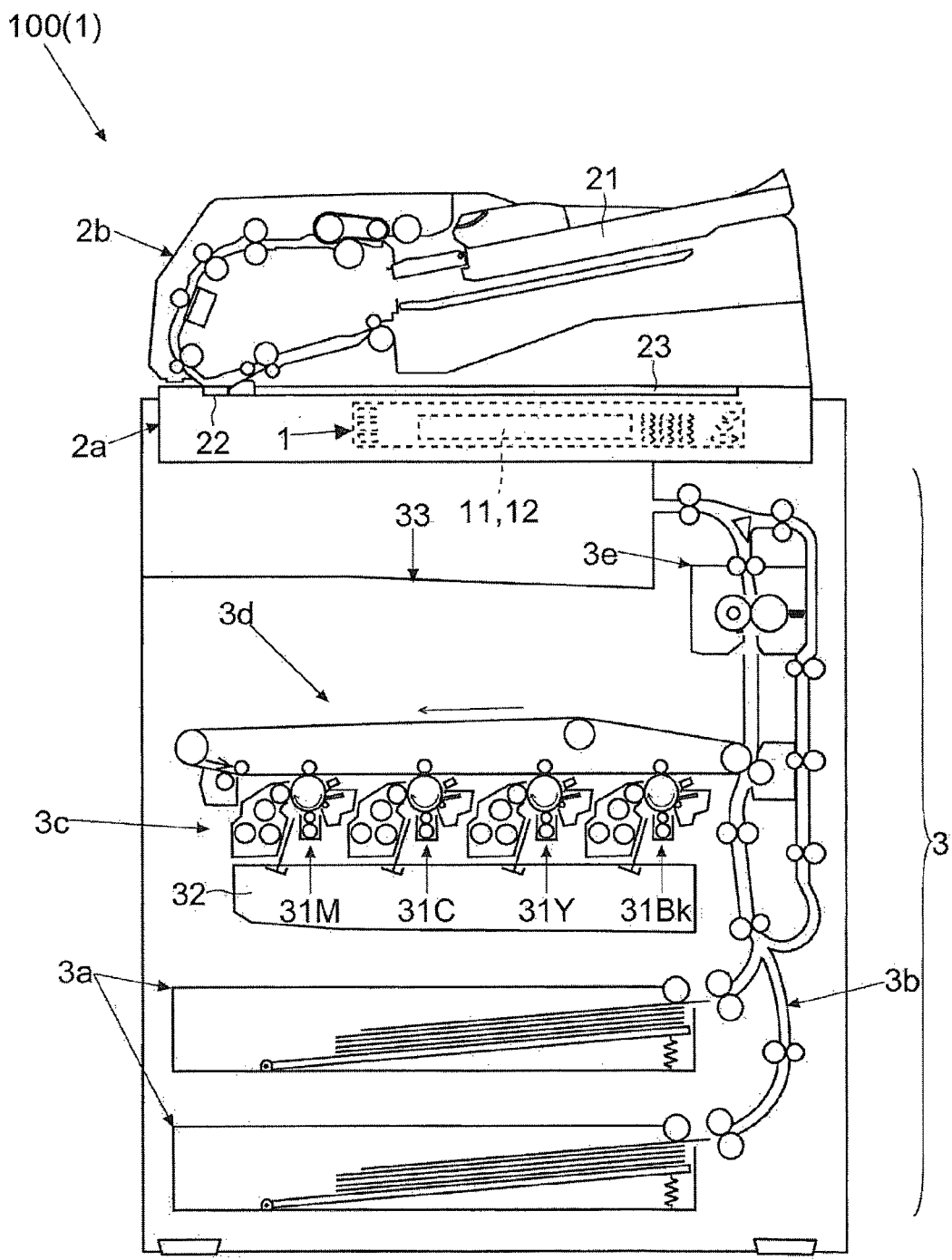
FIG. 1 is a diagram showing an example of a multifunction peripheral according to the embodiment.

First, a schematic structure of a main body of the multifunction peripheral 100 according to the embodiment is described with reference to FIG. 1.

The multifunction peripheral 100 of this embodiment includes an image reader unit 2a, a document feeder unit 2b, and the operation panel 1 (details of the operation panel 1 are described later). The document feeder unit 2b successively feeds document sheets set on a document set tray 21 one by one to a read position (feed-reading contact glass 22) of the image reader unit 2a. In addition, the document feeder unit 2b can be opened and closed in such a manner that a front side swings about a pivot point (not shown) disposed on a rear side in FIG. 1. A document such as a book can be placed on a place-reading contact glass 23, and the document can be pressed downward by closing the document feeder unit 2b. The image reader unit 2a reads a document sheet passing the feed-reading contact glass 22 or a document placed on the place-reading contact glass 23, so as to generate image data. The generated image data of the document is used for copying, transmission, or the like.

In addition, a printer unit 3 is disposed in the main body of the multifunction peripheral 100. The printer unit 3 includes a paper sheet feeder 3a, a transport unit 3b, an image forming portion 3c, an intermediate transfer unit 3d, and a fixing unit 3e.

The paper sheet feeder 3a stores and feeds paper sheets used for printing. The transport unit 3b is a passage for transporting a paper sheet in the apparatus. The image forming portion 3c includes image forming units 31Bk, 31Y, 31C, and 31M of individual colors (black, yellow, cyan, and magenta) and an exposing device 32 for exposing photoreceptor drums of the image forming units 31Bk to 31M, respectively. The image forming units 31Bk, 31Y, 31C, and 31M and the exposing device 32 form toner images of the individual colors based on the image data. The intermediate transfer unit 3d undergoes primary transfer of toner images generated by the image forming units 31Bk, 31Y, 31C, and 31M and performs secondary transfer of the toner images onto a paper sheet fed from the paper sheet feeder 3a. The fixing unit 3e fixes the toner image transferred onto the paper sheet. The transport unit 3b discharges the paper sheet after passing through the fixing unit 3e onto a discharge tray 33.

(Operation Panel 1)

Figure 2:
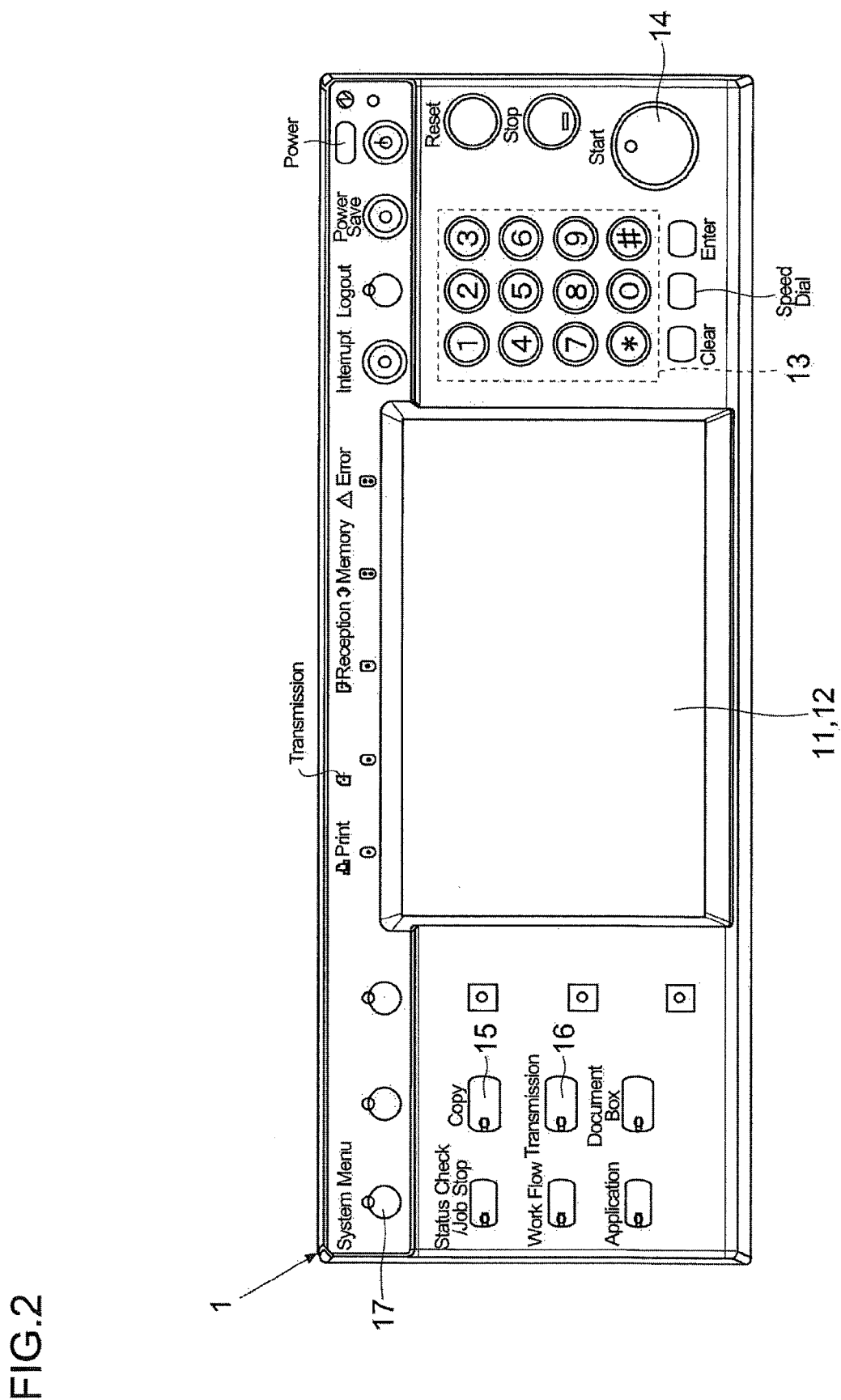
FIG. 2 is a diagram showing an example of an operation panel according to the embodiment.

Next, an example of the operation panel 1 according to the embodiment is described with reference to FIG. 2.

The operation panel 1 functions as a display input device for job setting such as copy (print), document reading, or image data transmission. Further, as shown in FIG. 1, the operation panel 1 is disposed on the upper front of the multifunction peripheral 100. Further, as shown in FIG. 2, the operation panel 1 includes a display unit 11.

The display unit 11 is a liquid crystal display panel. However, any type of display unit can be used as long as it can display screens and images. It is possible to use an organic EL display panel or other display panel than the liquid crystal panel. Further, the display unit 11 displays a screen for selecting a set item (or a function to be used) and a screen for setting a set value. In addition, the display unit 11 displays buttons (keys) for selecting a set item, setting a set value, completing the setting, canceling the setting, and instructing to execute a job in the individual screens. The user operates a button displayed on the display unit 11 (touches a display position of the button). Thus, it is possible to perform setting for a job such as printing, scanning, or transmission available in the multifunction peripheral 100, and setting for the system.

In addition, a touch panel unit 12 is disposed on the upper surface of the display unit 11. The touch panel unit 12 is used for detecting a touch position or coordinates. In other words, the touch panel unit 12 accepts an operation on a screen of the display unit 11 and accepts an operation on a button displayed on the display unit 11. Note that a touch panel unit that can detect multiple touch points (such as a capacitive type) is used as the touch panel unit 12.

In addition, the operation panel 1 is provided with hardware keys such as a numeric key unit 13 for numerical input, and a start key 14 for instructing to start a job. In addition, the operation panel 1 is also provided with hardware keys for selecting a function, such as a copy key 15 to be pressed for using a copy function and a transmission key 16 to be pressed for using a transmission function such as a scanner function or a FAX function. In addition, the operation panel 1 is also provided with a system menu key 17 to be pressed for system setting of the multifunction peripheral 100, such as department management, user management, or communication setting.

(Hardware Structure of Multifunction Peripheral 100)

Figure 3:
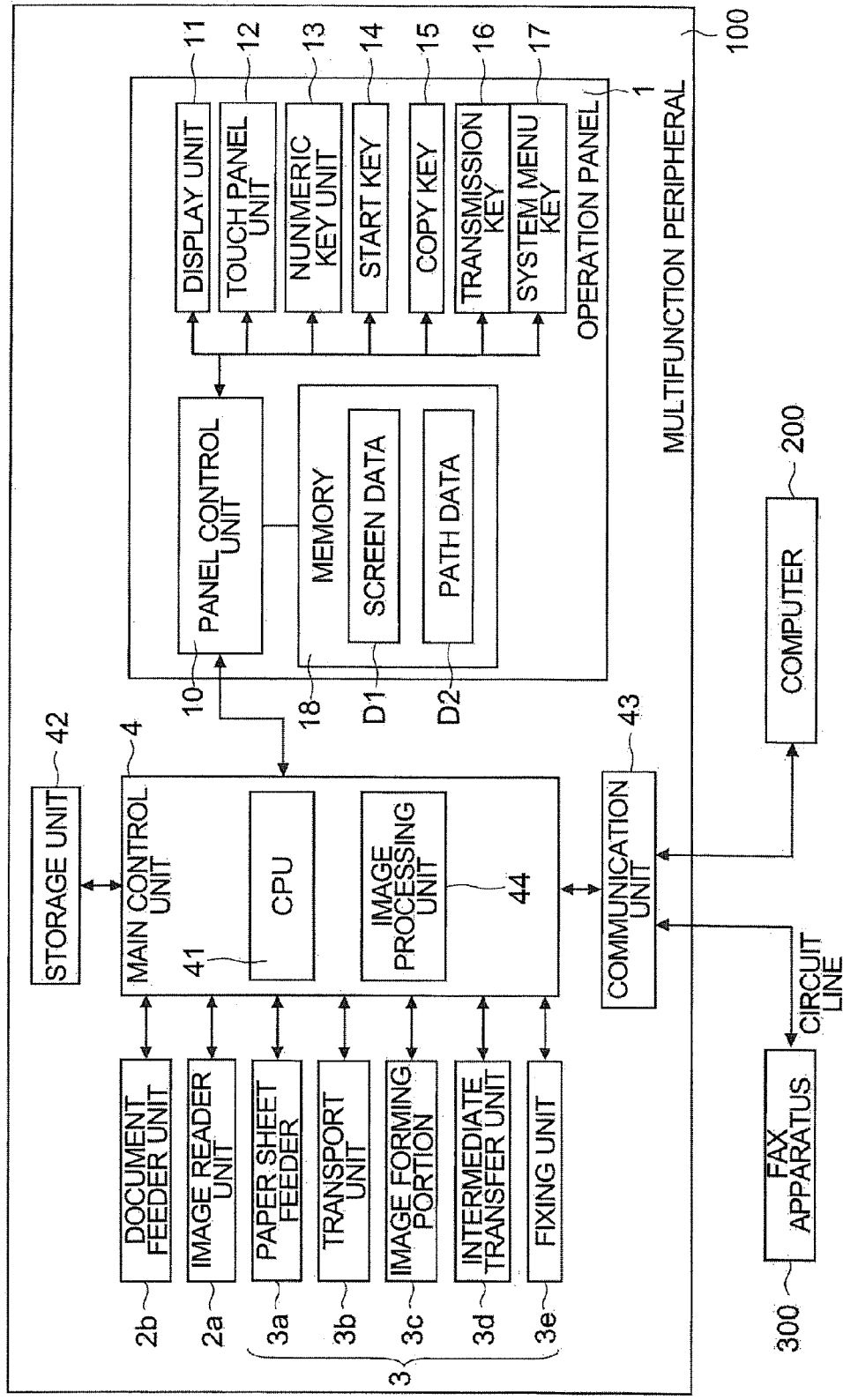
FIG. 3 is a diagram showing an example of a hardware structure of the multifunction peripheral according to the embodiment.

Next, a hardware structure of the multifunction peripheral 100 according to the embodiment is described with reference to FIG. 3.

A main control unit 4 is disposed in the multifunction peripheral 100. The main control unit 4 controls the operation panel 1, the image reader unit 2a, the document feeder unit 2b, and the printer unit 3 (the paper sheet feeder 3a, the transport unit 3b, the image forming portion 3c, and the fixing unit 3e).

The main control unit 4 includes an element such as a CPU 41 for processing and calculation. The CPU 41 performs calculation based on a control program stored in a storage unit 42, and controls individual units of the multifunction peripheral 100. Note that the main control unit 4 may be divided into function units including a control unit for overall control and image processing, and an engine control unit for controlling printing such as image formation and ON/OFF of motors for rotating various rotation members.

The storage unit 42 is connected to the main control unit 4 in a communicable manner. The storage unit 42 is a combination of a nonvolatile storage device such as a ROM or an HDD, and a volatile storage device such as a RAM. The storage unit 42 stores control programs and data such as control data, setting data, and image data for the multifunction peripheral 100.

Further, the main control unit 4 is connected to a communication unit 43 (communication interface) including a connector, a socket, and a FAX modem. The communication unit 43 is connected to a plurality of external computers 200 (such as personal computers and servers) and FAX apparatuses 300 (only one for each is shown in FIG. 3 for convenience sake) via a network or a public line in a communicable manner. Using the communication unit 43, image data obtained by document reading by the image reader unit 2a can be transmitted to the computer 200 or the FAX apparatus 300 on the other end (as the scanner function or the FAX function). In addition, it is possible to perform printing in accordance with image data transmitted from the computer 200 or the FAX apparatus 300 to be input to the communication unit 43 (multifunction peripheral 100) (as a printer function or the FAX function).

In addition, the main control unit 4 is provided with an image processing unit 44 for performing image processing on image data obtained by reading a document by the image reader unit 2a or image data supplied to the multifunction peripheral 100 via the communication unit 43. The image data processed by the image processing unit 44 is used for printing in the image forming portion 3c, is stored in the storage unit 42, or is transmitted from the communication unit 43 to the computer 200 or the FAX apparatus 300.

In addition, the main control unit 4 is connected to the operation panel 1 in a communicable manner. The main control unit 4 receives from the operation panel 1a signal indicating contents of input or setting made on the operation panel 1, and controls the printer unit 3, the document feeder unit 2b, the image reader unit 2a, the communication unit 43, and the storage unit 42, so that a job such as copying or transmission is executed in accordance with setting by the user.

Next, the operation panel 1 according to this embodiment is described. The operation panel 1 includes a panel control unit 10, a memory 18, the display unit 11, the touch panel unit 12, the numeric key unit 13, the start key 14, the copy key 15, the transmission key 16, and the system menu key 17.

The panel control unit 10 includes a CPU, an IC, and a driver circuit for the panel of the display unit 11. The panel control unit 10 controls a display on the display unit 11. In addition, the panel control unit 10 receives an output of the touch panel unit 12. The panel control unit 10 recognizes coordinates of a position pressed (touched) on the display unit 11 (touch panel unit 12). A table (data) indicating association between an output of the touch panel unit 12 and the coordinates is stored in the memory 18. The panel control unit 10 compares the coordinates of the pressed position and image data of the screen displayed on the display unit 11, so as to specify and recognize the operated (pressed) button. In addition, the panel control unit 10 receives a signal from a hardware key and recognizes which hardware key is pressed.

In addition, the memory 18 stores screen data D1 for displaying screens in accordance with an operation to the touch panel unit 12 (an operation on a button disposed in each screen) or an operation on a hardware key. The screen data D1 are data of a background, a framework, a button, a message, an explanation and the like to be displayed (image data and text data) and data defining display positions of them for each screen, and include various data necessary for the display. The panel control unit 10 reads out data necessary for displaying the next screen from the screen data D1 in accordance with the operation, so as to control the display unit 11 to switch the screen.

(Hierarchical Structure of Screen Display)

Next, a hierarchical structure of the screen display on the operation panel 1 according to this embodiment is described with reference to FIG. 4.

In the operation panel 1 according to this embodiment, the screen display has a hierarchical structure. When a key such as the system menu key 17, the copy key 15, or the transmission key 16 is pressed, a main menu screen prepared for each function is displayed (see FIG. 5, which shows a screen corresponding to the system menu key 17, as a main menu screen 51 concerning system setting). Main menu screens are prepared for individual functions of copying, transmission, and system setting, respectively. Each main menu screen corresponds to a first layer (highest layer) shown in FIG. 4.

When a button displayed in the screen is operated, the panel control unit 10 controls the display unit 11 to display a next lower layer screen corresponding to the operated button. Note that a button such as a return button B14 for returning to a higher layer is disposed in the screen. When the button for returning to a higher layer is operated, the panel control unit 10 controls the display unit 11 to display a next higher layer screen of the currently displayed screen.

Figure 4:
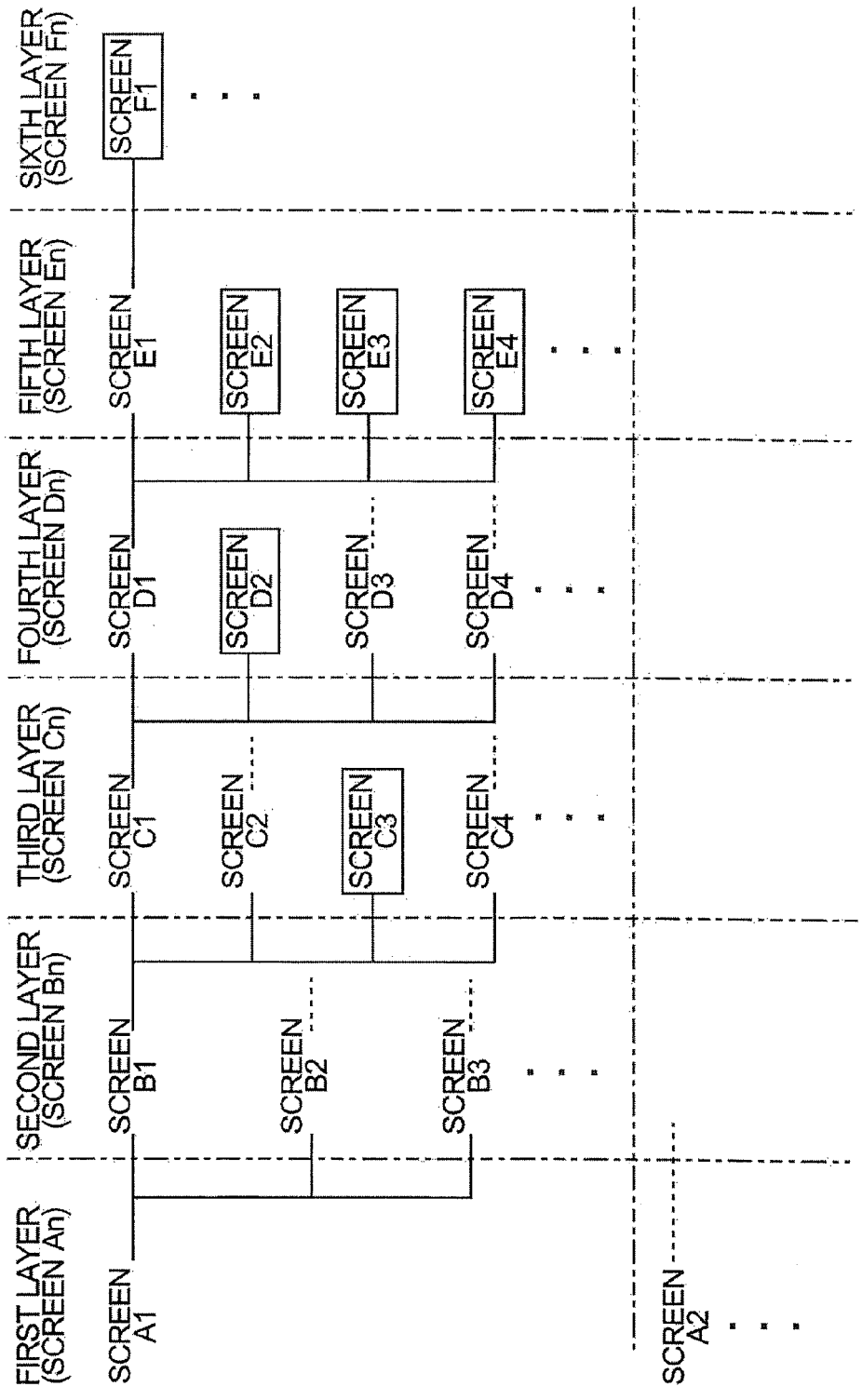
FIG. 4 is a diagram showing an example of a hierarchical structure of a screen display of the operation panel according to the embodiment.

Further, in FIG. 4, screens in solid line boxes as marks (screen C3, screen D2, screens E2 to E4, and the like) are lowest layers in transition paths. In other words, the screens in solid line boxes as marks are end screens having no lower layers in the paths. The lowest layer screen is a screen for selecting a set value. As shown in FIG. 4, the screen layer for setting a set value is not always in the same layer, and the number of layers between the highest layer and the lowest layer depends on the path. Therefore, the number of times of operating buttons until reaching the screen for setting a set value depends on a type of the screen.

Because of this hierarchical structure, the user operates buttons a plurality of times to reach a target screen, so as to trace the path from the first layer (highest layer) to the target screen (desired screen).

(Normal Screen Switching Operation)

The operation panel 1 according to this embodiment has a list display mode in which the display unit 11 can perform a list display. However, as necessary for later description and in order to explain the hierarchical structure of the display, a normal screen switching operation (in a normal mode) is first described with reference to FIGS. 5 to 14.

In this description, there is exemplified a case where setting about system of the multifunction peripheral 100 is made. Specifically, there is described a case where the system menu key 17 (see FIG. 2) is pressed on the operation panel 1 so as to set about the user management. Descriptions about other settings (paths) are the same and are omitted.

Figure 5:
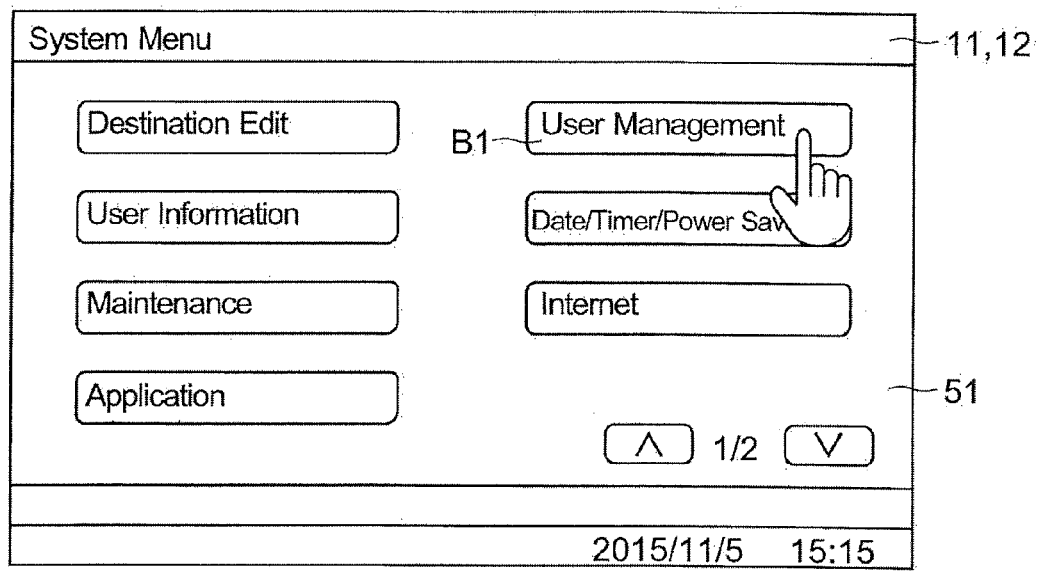
FIG. 5 is a diagram showing an example of a screen displayed on the operation panel according to the embodiment.

FIG. 5 shows an example of the main menu screen 51 that is displayed when the system menu key 17 is pressed. When the system menu key 17 is pressed, the panel control unit 10 controls the display unit 11 to display the main menu screen 51. The main menu screen 51 is the highest layer screen among screens about the system setting.

Further, in the normal mode, the user repeats the operations on buttons so as to reach a target screen. Specifically, in the normal mode, when an operation of a user management button B1 (touching of a display position thereof) is made and a finger is taken off without a first operation (long pressing) for a display in the list display mode (details are described later), the panel control unit 10 controls the display unit 11 to switch the screen. Further, in the normal mode, the display unit 11 switches the screen to be displayed in accordance with the operated button from the currently displayed screen to one of a lower layer screen and a higher layer screen.

A plurality of buttons are disposed in the main menu screen 51. The buttons disposed in the main menu screen 51 indicate broad classifications (set items). When setting about the user management, the user operates (touches a display position of) the user management button B1 (bearing a character string "user management"). Further, when a button other than the user management button B1 is operated in the main menu screen 51, a corresponding screen (about one of various system settings such as a destination edit or maintenance) is displayed (detailed description is omitted).

Figure 6:
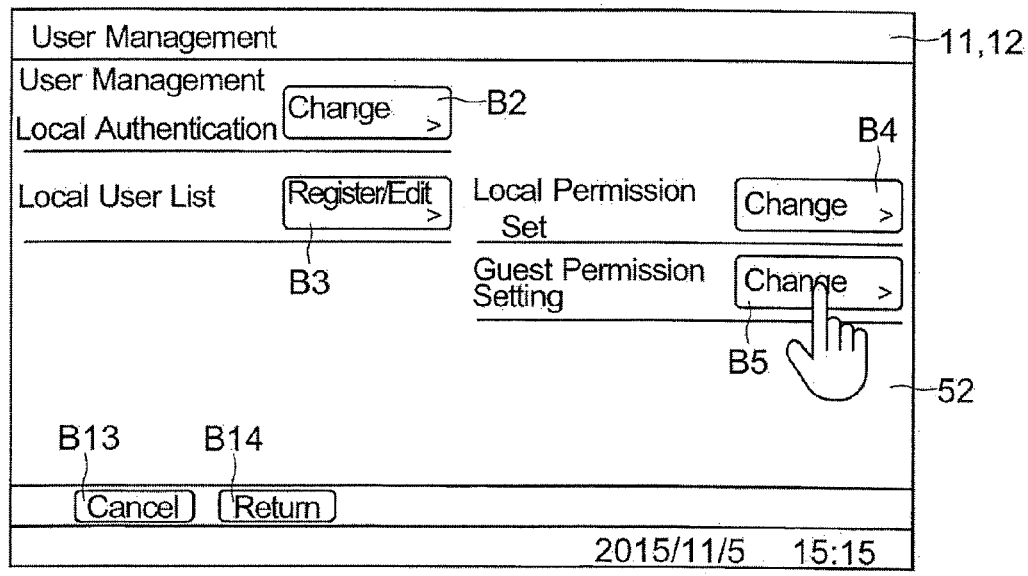
FIG. 6 is a diagram showing an example of a screen displayed on the operation panel according to the embodiment.

When the user management button B1 is operated, the panel control unit 10 controls the display unit 11 to display a user management screen 52 belonging to the next lower layer (see FIG. 6). In the user management screen 52, there are disposed an authentication method button B2 (accompanying a character string "user management" and bearing a character string "change"), a user list button B3 (accompanying a character string "local user list" and bearing a character string "register/edit"), a local permission button B4 (accompanying a character string "local permission" and bearing a character string "change"), and a guest permission button B5 (accompanying a character string "guest permission setting" and bearing a character string "change").

The authentication method button B2 is a button for displaying a screen for setting whether to perform local authentication (based on user information stored in the multifunction peripheral 100) or to perform network authentication (based on user information stored in a server via a network). The user list button B3 is a button for registering or editing a user who is given permission to use the multifunction peripheral 100. The local permission button B4 is a button for displaying a screen for restricting functions (such as copying, scanning, and transmission) that each user can use or for canceling the restriction. The guest permission button B5 is a button for displaying a screen for setting about a person (guest) who is not registered as a user in the multifunction peripheral 100 or a server and hence is not permitted to use the multifunction peripheral 100 as a rule.

Figure 7:
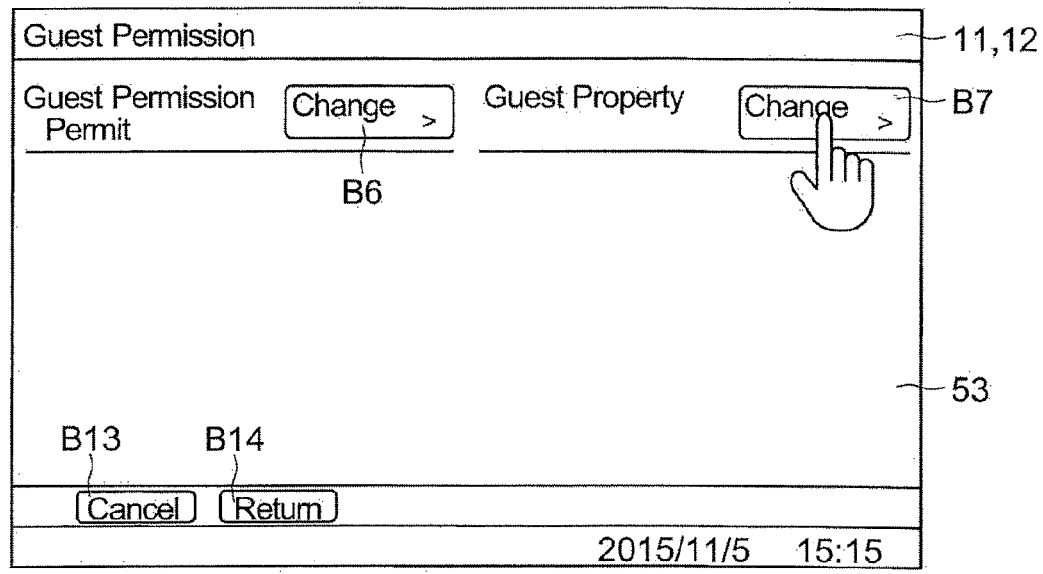
FIG. 7 is a diagram showing an example of a screen displayed on the operation panel according to the embodiment.

When the guest permission button B5 is operated in the user management screen 52, the panel control unit 10 controls the display unit 11 to display a guest permission setting screen 53 belonging to the next lower layer (see FIG. 7). Further, when a button other than the guest permission button B5 is pressed in the user management screen 52, a corresponding screen is displayed (detailed description is omitted).

In the guest permission setting screen 53, there are disposed a guest permission/inhibition button B6 (accompanying a character string "guest permission" and bearing a character string "change"), and a guest property button B7 (accompanying a character string "guest property" and bearing a character string "change"). The guest permission/inhibition button B6 is a button for displaying a screen for setting whether or not to temporarily permit a temporary use of the multifunction peripheral 100 to a guest. The guest property button B7 is a button for displaying a screen for setting information of the guest (guest property).

Figure 8:
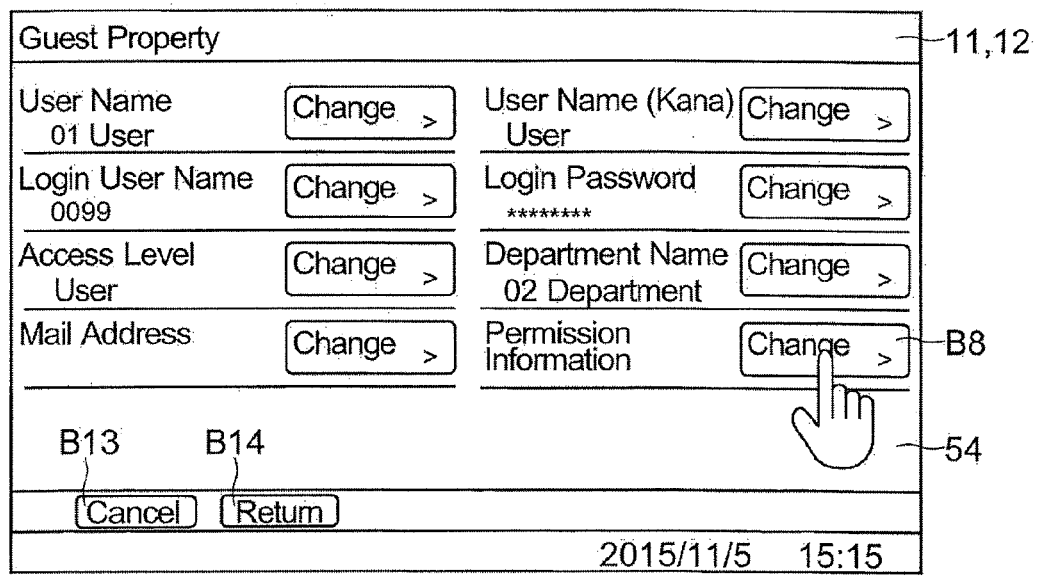
FIG. 8 is a diagram showing an example of a screen displayed on the operation panel according to the embodiment.

When the guest property button B7 is operated in the guest permission setting screen 53, the panel control unit 10 controls the display unit 11 to display a guest property setting screen 54 belonging to the next lower layer (see FIG. 8). Further, when a button other than the guest property button B7 is pressed in the guest permission setting screen 53, a corresponding screen is displayed (detailed description is omitted).

In the guest property setting screen 54, there are disposed total eight buttons for setting information in the case where the guest is regarded as a user. By touching one of buttons disposed in the guest property setting screen 54, it is possible to set a user name (i.e., a guest name), a log-in name for logging in as a guest, and a password for logging in as a guest (see FIG. 8). When a button corresponding to a set item that requires input of a character string (such as the guest name) is operated, the panel control unit 10 controls the display unit 11 to display a software keyboard (not shown) for inputting a character string. In addition, among the buttons disposed in the guest property setting screen 54, a permission information button B8 (accompanying a character string "permission information" and bearing a character string "change") is a button for displaying a screen for restricting functions that the guest can use among functions (such as copying and transmission) of the multifunction peripheral 100 and for changing the function that the guest can use.

When the permission information button B8 is operated in the guest property setting screen 54, the panel control unit 10 controls the display unit 11 to display a use restriction setting screen 55 belonging to the next lower layer (see FIG. 9). Further, when a button other than the permission information button B8 is pressed in the guest property setting screen 54, a corresponding screen is displayed (detailed description is omitted).

In the use restriction setting screen 55, there are disposed total nine buttons for restricting functions that a guest can use. By operating the buttons disposed in the use restriction setting screen 55, it is possible to determine functions that the user as a guest can use.

As to printing, it can be set whether or not a guest can use the multifunction peripheral 100 as a copy machine or a printer. In addition, for copying or printing, it can be set whether or not the guest can use color printing. In addition, as to transmission, it can be set whether or not to permit a guest to store image data read by the image reader unit 2a in an external memory (such as a USB memory or a memory card connected to the multifunction peripheral 100) or in the storage unit 42, and whether or not to permit a guest to use the transmission function via network or facsimile. Further, among the buttons disposed in the restriction setting screen 55, a transmission restriction button B9 (accompanying a character string "transmission restriction" and bearing a character string "change") is a button for displaying a screen for setting whether or not a guest can use a transmission function (except the facsimile transmission) of image data to the computer 200 or the storage device on a network.

When the transmission restriction button B9 is operated in the restriction setting screen 55, the panel control unit 10 controls the display unit 11 to display a transmission restriction setting screen 56 belonging to the next lower layer (see FIG. 10). Further, when the button other than the transmission restriction button B9 is pressed on the use restriction setting screen 55, a screen corresponding to the operated button is displayed (detailed description is omitted).

The transmission restriction setting screen 56 is a screen for setting a set value and is the lowest layer screen without a lower layer. In the transmission restriction setting screen 56, it is possible to select (set) either one of a set value indicating "to permit the guest to use transmission" and a set value indicating "not to permit the guest to use transmission".

Specifically, in the transmission restriction setting screen 56, there are displayed a restriction execution button B10 (bearing a character string "set") for executing the transmission restriction and a restriction inexecution button B11 (bearing a character string "not set") for not executing the transmission restriction. When an OK button B12 (bearing a character string "OK") is operated after the restriction execution button B10 is operated, the panel control unit 10 recognizes that the setting for executing the transmission restriction is made. The panel control unit 10 transmits the set content to the main control unit 4. As a result, the main control unit 4 controls the communication unit 43 to disable image data transmission from the multifunction peripheral 100 by a guest. Alternatively, the panel control unit 10 does not accept or ignores the transmission execution instruction from the guest. On the other hand, when the OK button B12 is operated after the restriction inexecution button B11 is operated, the panel control unit 10 recognizes that the setting for not executing the transmission restriction is made. In this case, the panel control unit 10 transmits the setting about transmission by the guest to the main control unit 4. The main control unit 4 controls the communication unit 43 and the image reader unit 2a so that a transmission job based on the setting by the guest.

Here, the OK button B12 is disposed in the lowest layer screen (for setting a set value). In other words, the OK button B12 may be disposed in a screen for setting a set value other than the screen shown in FIG. 10. When the OK button B12 is operated so that setting of a set value is completed, the panel control unit 10 switches the screen to the highest layer screen (to return to a base screen or a main menu screen).

In addition, a cancel button B13 bearing a character string "cancel") is also disposed in each screen. When the cancel button B13 is operated, the panel control unit 10 does not change the current set value and controls the display unit 11 to display the highest layer screen (the main menu screen). In addition, the return button B14 (bearing a character string "return") is disposed in screens other than the highest layer screen. When the return button B14 is operated, the panel control unit 10 controls the display unit 11 to display a next higher layer screen of the current screen (to return the path).

In this way, the display unit 11 displays the buttons in the screen. Further, in accordance with an output of the touch panel unit 12 for accepting an operation of a button displayed on the display unit 11, the display unit 11 switches the currently displayed screen to one of a lower layer screen and a higher layer screen.

In addition, for the later description, there is described a screen that is displayed when operating the user list button B3 (accompanying a character string "local user list" and bearing a character string "register/edit") in the user management screen 52 (see FIG. 6) described above (a screen on the path when the user list button B3 is operated).

Figure 11:
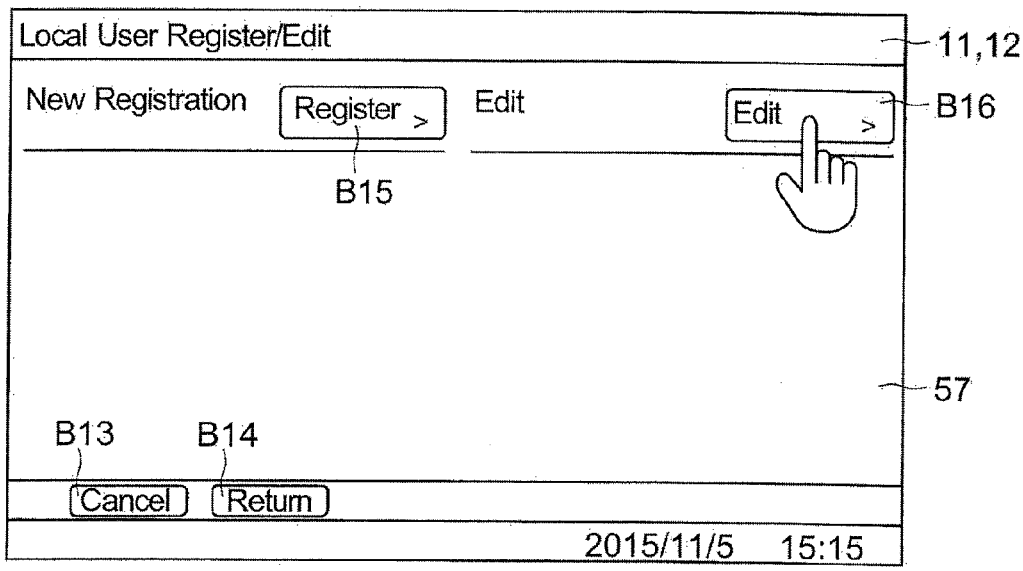
FIG. 11 is a diagram showing an example of a screen displayed on the operation panel according to the embodiment.

When the user list button B3 is operated in the user management screen 52, the panel control unit 10 controls the display unit 11 to display a register/edit screen 57 belonging to the next lower layer (see FIG. 11). The register/edit screen 57 is a screen for registering a user and changing registered contents.

In the register/edit screen 57, there are displayed a new registration button B15 (accompanying a character string "new registration" and bearing a character string "register"), and an edit button B16 (accompanying a character string "edit" and bearing a character string "edit"). The new registration button B15 is a button for displaying a screen for newly registering a person (user) who can use the multifunction peripheral 100. The edit button B16 is a button for displaying a screen for editing (changing or correcting) user information (user property) stored already in the multifunction peripheral 100 (storage unit 42) as a user who can use.

Figure 12:
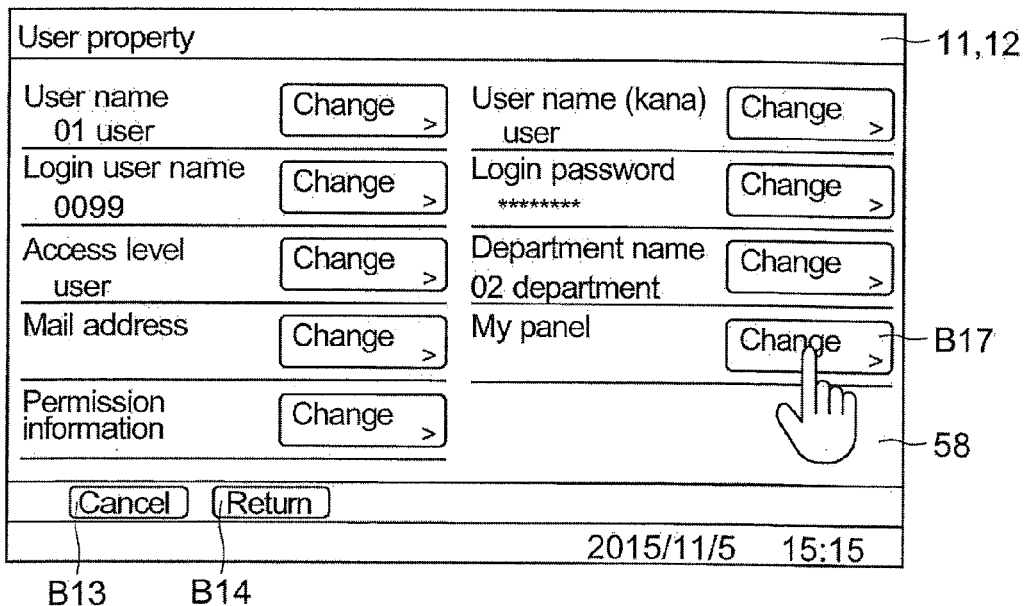
FIG. 12 is a diagram showing an example of a screen displayed on the operation panel according to the embodiment.

When the edit button B16 is operated in the register/edit screen 57, the panel control unit 10 controls the display unit 11 to display a user property setting screen 58 belonging to the next lower layer (see FIG. 12). Note that the user property setting screen 58 is displayed also when the new registration button B15 is pressed in the register/edit screen 57. However, the user property setting screen 58 in the state where all items are not set is displayed.

In the user property setting screen 58, registered user information is displayed for each item. In addition, in the user property setting screen 58, there are disposed total nine buttons for setting user information. By touching one of buttons disposed in the user property setting screen 58, it is possible to set or change an item such as a user name, a log-in name for logging in, or a password for the user to log in (see FIG. 12). When a button corresponding to a set item that requires input of a character string (such as the user name) is operated, the panel control unit 10 controls to display a software keyboard (not shown) for inputting a character string. In addition, among the buttons disposed in the user property setting screen 58, a my panel button B17 (accompanying a character string "my panel" and bearing a character string "change") is a button for displaying a screen for setting a manner in which the screen is displayed when the user logs in.

Further, the user is required to log in for using the multifunction peripheral 100. In order to log in, the user inputs a user name, a log-in name, and a password, which are registered in advance, to the operation panel 1. The memory 18 stores each user information in the user property setting screen 58. Further, the panel control unit 10 compares the input information with each user information in the memory 18, allows log in of the user whose information are matched (authenticates the user), and accepts various operations made by the user. On the other hand, when the input information does not match with user information that is registered in advance, the panel control unit 10 does not allow the log-in and maintains a logged out state. Further, the panel control unit 10 does not accept various operations made by the user.

As a result, in the logged out state, an instruction to execute a job and various setting inputs are not accepted, and hence the multifunction peripheral 100 cannot be used.

Figure 13:
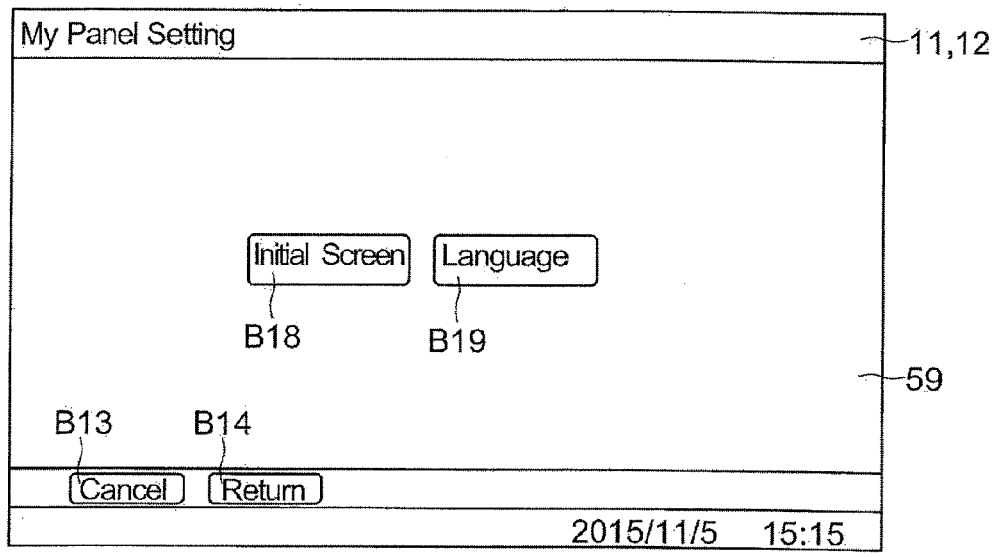
FIG. 13 is a diagram showing an example of a screen displayed on the operation panel according to the embodiment.

When the my panel button B17 is operated in the user property setting screen 58, the panel control unit 10 controls the display unit 11 to display a my panel setting screen 59 belonging to the next lower layer (see FIG. 13). Further, when a button other than the my panel button B17 is pressed in the user property setting screen 58, a corresponding screen is displayed (detailed description is omitted).

In the my panel setting screen 59, there are displayed an initial screen button B18 (bearing a character string "initial screen") and a language button B19 (bearing a character string "language"). The initial screen button B18 is a button for displaying a screen for setting which screen should be displayed first when a user logs in (which screen is an initial screen). For instance, it is possible to set a specific screen different from a default one to be displayed first when a user logs in. The language button B19 is a button for displaying a screen for setting a language to be used in the screen when a user logs in.

Figure 14:
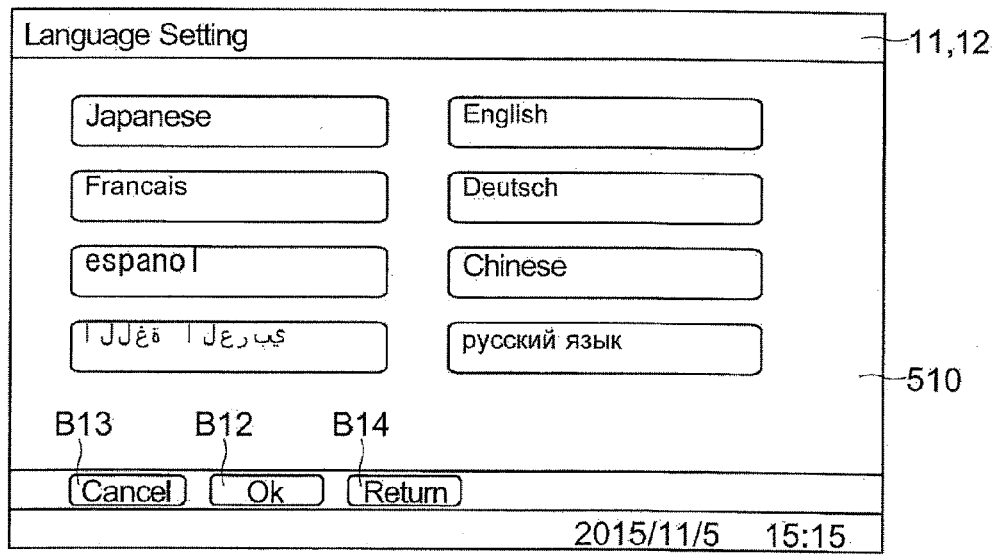
FIG. 14 is a diagram showing an example of a screen displayed on the operation panel according to the embodiment.

When the language button B19 is operated in the my panel setting screen 59, the panel control unit 10 controls the display unit 11 to display a language setting screen 510 belonging to the next lower layer (see FIG. 14). Note that the language setting screen 510 is the lowest layer screen. Further, when the initial screen button B18 is pressed in the my panel setting screen 59, a corresponding screen is displayed (detailed description is omitted).

In the language setting screen 510, there are disposed total eight buttons for selecting a language that can be used in character strings displayed in the screen. The multifunction peripheral 100 of this embodiment supports a plurality of languages including Japanese, English, and the like (see FIG. 14). By operating a button disposed in the language setting screen 510, a user can select a language used for display when the user logs in.

When the OK button B12 (bearing a character string "OK") is operated after a display position of one of buttons in the language setting screen 510 is touched, the panel control unit 10 recognizes that setting for using the language corresponding to the operated button is made. Further, the panel control unit 10 controls the memory 18 to store the language set in the language setting screen 510 for each user. Further, the panel control unit 10 controls the display unit 11 to display a screen using the language selected by the user based on the storage content.

(Outline of Display in List Display Mode)

Next, outline of the list display mode of the operation panel 1 according to this embodiment is described with reference to FIGS. 5, 15, and 16.

The touch panel unit 12 accepts a predetermined first operation as an instruction to perform the list display (an instruction to change to the list display mode). When the touch panel unit 12 accepts the first operation, the panel control unit 10 changes mode of the display unit 11 to the list display mode. In other words, when the first operation is accepted by the touch panel unit 12, the panel control unit 10 controls the display unit 11 to start a display in the list display mode.

Further, in the list display mode, the panel control unit 10 selects each layer screen so as to move toward a lower layer one by one from the next lower layer screen of the screen on which the first operation is made (the screen displayed when the button on which the first operation is made is operated) (see FIG. 15). The panel control unit 10 selects a predetermined or smaller number of screens. Then, the panel control unit 10 controls the display unit 11 to perform the list display by reducing the selected layer screens (over a plurality of layers) to be smaller than screens in the normal mode. In addition, the panel control unit 10 controls the display unit 11 to display the screens in order from the highest layer screen in the list display. In this way, a plurality of screens (of a plurality of layers) on the path for moving toward a lower layer one by one from a certain screen are displayed together. Therefore, it is possible to check a plurality of screens belonging to lower layers promptly at a glance. The user can quickly understand which screen switching is necessary to reach a target screen. In addition, the user can easily check the hierarchical structure of the screen display.

Further, it is possible to finish the list display mode and to return to the normal mode by a predetermined finishing operation for finishing the list display mode (details are described later).

The first operation is described. The touch panel unit 12 of this embodiment accepts an operation of long-pressing a display position of one of buttons displayed in the screen in the state of the normal mode as the first operation. Further, the panel control unit 10 recognizes the long pressing operation on one of buttons in the normal mode as an input of an instruction to execute the list display (an instruction to change to the list display mode).

Specifically, when a display area of the same button is continuously touched for a predetermined long pressing time (e.g., approximately 0.5 to a few seconds) after the display position of the button is touched, the panel control unit 10 recognizes that the long pressing (first operation) is made based on an output of the touch panel unit 12. In accordance with this recognition as a trigger, the panel control unit 10 controls the display unit 11 to perform the list display.

Further, when the long pressing is continued, a touch position may be shifted from a long press position. In addition, there may be a user who cannot easily press the same position continuously because of an injured hand or a congenital reason. Therefore, even if the panel control unit 10 recognizes that the touch position is shifted based on an output of the touch panel unit 12, the panel control unit 10 may recognize that the touching (first operation) is continued in the case where a shift distance is within a predetermined permissible range.

Specifically, the description is added with reference to FIGS. 5 and 15. FIG. 15 shows an example of a list screen displayed when the first operation is made on the user management button B1 in the main menu screen 51 shown in FIG. 5.

In this case, the panel control unit 10 first selects the user management screen 52 that is a screen corresponding to the user management button B1 (a screen to be displayed when the button is operate in the normal mode) as the screen to be displayed in the list. Further, the panel control unit 10 selects each layer screen so as to move toward a lower layer one by one from the initially selected screen. For instance, as shown in FIG. 15, the panel control unit 10 selects, in order from an higher layer, the guest permission setting screen 53 (see FIG. 7) that is the next lower layer of the user management screen 52, the guest property setting screen 54 (see FIG. 8) that is the next lower layer of the guest permission setting screen 53, and the use restriction setting screen 55 (see FIG. 9) that is the next lower layer of the guest property setting screen 54.

Here, in the operation panel 1 according to this embodiment, the number of screens displayed in the list display mode (the number of screens selected by the panel control unit 10 or a predetermined number of screens) is four. There is a lower layer screen of the use restriction setting screen 55 (see FIG.

9), but the panel control unit 10 selects four screens at most, reduces the four screens, and controls the display unit 11 to display the reduced screens in the list display.

Here, the predetermined number of screens should be determined appropriately by considering a size (inches) of the display unit 11, a resolution, and visibility of the reduced screen. Therefore, the predetermined number of screens may be six or eight, or may be smaller than four (though two or larger for the list display). Further, the panel control unit 10 divides the display area by the predetermined number of screens, reduces the screens to be displayed in the divided areas in the normal mode so that the selected layer screens are fit in the individual areas, and controls the display unit 11 to display the selected layer screens.

Further, when the number of layers lower than the button on which the first operation is made is smaller than the predetermined number of screens, the panel control unit 10 selects a screen corresponding to the screen on which the first operation is made and screens on the path (process) toward the lowest layer. The panel control unit 10 controls the display unit 11 to display a vacant space as blank.

In this way, the touch panel unit 12 accepts an operation of long-pressing one of buttons displayed in the screen in the normal mode as the first operation. Further, when becoming the list display mode, the panel control unit 10 controls the display unit 11 to perform the list display of the reduced screens of the layer screens selected by regarding the screen corresponding to the button on which the first operation is made as a first layer screen so as to move from the first layer screen toward a lower layer one by one. In this way, by performing the first operation on the button to be checked which screen belongs to the lower layer, it is possible to restrict a range (path) of the screens to be displayed in the list so as to narrow the path of layers (screens to be selected) at an initial stage.

Here, the screens to be displayed in the list belong to different layers, and an arrangement order of the reduced screens is determined by noting the layers. The panel control unit 10 controls the display unit 11 to perform the list display of the screens (on the predetermined path) selected in a predetermined order from the higher layer screen. In other words, the panel control unit 10 controls the display unit 11 to perform the list display the reduced screens in a predetermined arrangement order of layers in the list display mode. In this way, it is possible to perform the list display of the reduced screens in a predetermined arrangement order (layer order). Therefore, it is possible to promptly recognize how many layers between a screen among the screens displayed in the list and the highest layer screen.

In the operation panel 1 according to this embodiment, the reduced screen is arranged in Z-order from the highest layer screen (see FIG. 15). Specifically, the panel control unit 10 controls the display unit 11 to display the reduced screen of the highest layer screen among the selected screens (user management screen 52) at the upper left position, controls the display unit 11 to display the reduced screen of the second highest screen (guest permission setting screen 53) among the selected screens at the upper right position, controls the display unit 11 to display the reduced screen of the third highest screen (guest property setting screen 54) among the selected screens at the lower left position, and controls the display unit 11 to display the reduced screen of the fourth highest layer (the lowest layer) screen (use restriction setting screen 55) among the selected screens at the lower right position.

Here, in the list display mode, the panel control unit 10 regards the screen corresponding to the button on which the first operation is made as the highest layer screen among the selected plurality of screens. Further, the panel control unit 10 selects the individual layer screens so as to move toward a lower layer one by one. In this case, it is necessary to select the layer screens by which path toward a lower layer. In other words, when the path is automatically determined so as to select the layers one by one toward a lower layer, it is necessary to determine to select which screen should be displayed when a certain button in the screen is operated.

Here, the screens to be displayed in the list can be selected (the path to be traced can be determined) as follows. For instance, the panel control unit 10 may select screens on the process of moving toward a lower layer one by one on a predetermined path with respect to the button on which the first operation is made. Further, the display unit 11 performs the list display of the reduced screens of the screens on the process of moving toward a lower layer by the predetermined path with respect to the button on which the first operation is made. In this way, only by making the first operation, the user can display the individual layer screens together, which are automatically selected so as to move toward a lower layer one by one, and hence can check contents of the screens. In this case, the memory 18 stores path data D2 (see FIG. 3) defining a path by which the screens are selected when a button is operated in the list display mode, for each button disposed in the screen.

In addition, the panel control unit 10 may select the screen corresponding to the button on which the first operation is made, and screens on the process of moving toward a lower layer one by one by performing an operation on a button at a predetermined position in the screen among buttons disposed in the selected screen. Further, the display unit 11 performs the list display of the reduced screens of the screens on the process of moving toward a lower layer one by one by regarding that the operation on a button at a predetermined position is made in the screen. In this way, the user can check contents of the screens by displaying together the screens of the individual layers that are automatically selected so as to move toward a lower layer one by one based on a certain rule only by making the first operation. In this case, the memory 18 stores the path data D2 (see FIG. 3) defining a button at a position regarded as being operated among buttons disposed in the screen. Note that FIG. 15 shows an example in which the path is determined by selecting a screen displayed when the button disposed at the lower right position (right side and lower side) among buttons disposed in the selected layer screens is operated.

In addition, the panel control unit 10 may select screens on the process (path) of moving toward a lower layer one by one so as to reach the deepest layer screen from the screen corresponding to the button on which the first operation is made. In other words, the panel control unit 10 may determine the path so as to move to a layer screen that is farthest from the screen corresponding to the button on which the first operation is made (having a largest number of layers between the separate layers among the lowest layer screens that can be reached after operating the button on which the first operation is made). Further, the display unit 11 performs the list display of the reduced screens of the screens on the process of moving toward a lower layer one by one so as to reach the deepest layer screen from the screen corresponding to the button on which the first operation is made. In this way, only by making the first operation, the user can check contents of the screens by means of displaying together the screens of the individual layers that are automatically selected so as to move toward a lower layer one by one to the deepest (the lowest) layer (so that the number of screens that are automatically selected becomes largest). In this case, the memory 18 stores data defining a path for each button, which can reach the deepest layer screen, as the path data D2 (see FIG. 3).

One of the screens to be displayed in the list should be selected for each layer by one of the above-mentioned methods. However, as shown in FIG. 16, it is possible to adopt a structure in which the path to be traced can be set in advance in the automatic selection of the screens to be displayed in the list.

Figure 16:
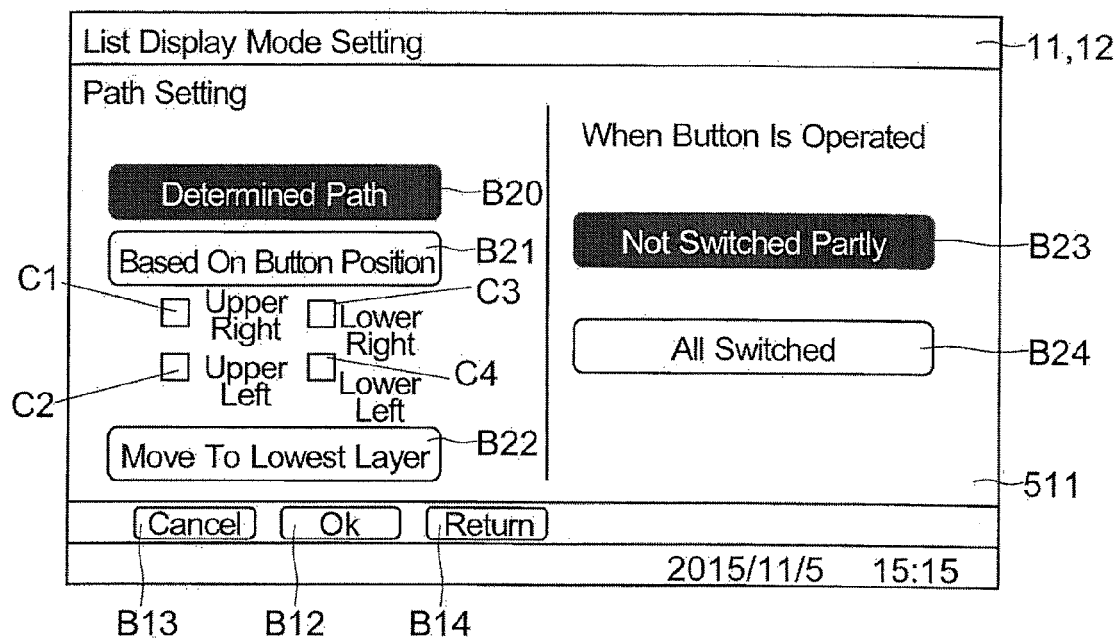
FIG. 16 is a diagram showing an example of path setting in the list display mode of the operation panel according to the embodiment.

FIG. 16 shows an example of a list display setting screen 511 for setting the path to be traced for selecting screens for performing the list display. The list display setting screen 511 can be displayed by making a predetermined operation on the operation panel 1.

Further, in the list display setting screen 511, there are disposed a first button B20 (bearing a character string "determined path"), a second button B21 (bearing a character string "based on button position"), and a third button B22 (bearing a character string "move to lowest layer"). In addition, four check boxes C1, C2, C3, and C4 are assigned to the second button B21.

The first button B20 is operated for controlling the panel control unit 10 to select one screen in each layer so as to trace a predetermined path and to move toward a lower layer one by one with respect to the button on which the first operation is made. The third button B22 is operated for controlling the panel control unit 10 to select one screen in each layer so as to move toward the lowest layer screen one by one.

In addition, the second button B21 is operated for controlling the panel control unit 10 to select one screen in each layer so as to move toward a lower layer one by one by regarding that a button at a predetermined position among buttons disposed in the screen is operated. Note that the position of the button can be selected by the check boxes C1 to C4.

Further, the panel control unit 10 may control the display unit 11 to display a cursor C5 indicating a screen that is selected as the screen to be displayed when a certain button is pressed (a reduced screen that is displayed when a certain button is operated among the layer screens) (see FIG. 15). In other words, the panel control unit 10 may control the display unit 11 to display the button regarded as being operated in an emphasized manner by the cursor C5 in the list display mode. In the example of FIG. 15, an ellipse figure is displayed as the cursor C5. However, other image such as an arrow, a symbol "o", a mark, a character, or the like may be displayed as the cursor C5.

(Switching of List Display Screen by Specified Operation)

Next, with reference to FIGS. 15 to 19, there is described switching of the list display screen by a specified operation on the operation panel 1 according to this embodiment.

The operation panel 1 according to this embodiment can display a plurality of screens including a screen associated with the screen on which the first operation is made (the next lower layer screen) and screens on the path for moving toward a lower layer from the screen one by one in the list display by reducing the screens to be smaller than those in the normal mode.

Further, by making the specified operation on a button disposed in one of screens (reduced screens) in the list display by the first operation, it is possible to perform a list display of screens on other path. In other words, by the specified operation, it is possible to perform the list display of screens to be displayed when other button is selected (screens on a path different from the currently displayed path).

Specifically, the touch panel unit 12 accepts an operation on a button included in one of reduced screens of the list display in the list display mode as the specified operation. A condition of maintaining the list display mode is to touch at least one point from the first operation on the touch panel unit 12. Further, the touch panel unit 12 accepts an operation of touching another display position of one of buttons in the screens of the list display while continuing the touch of at least one point on the touch panel unit 12 as the specified operation.

In addition, after the first operation, when the list display mode is maintained even if the touch on the touch panel unit 12 is ceased, the touch panel unit 12 accepts a one point touch operation of a display position of one of buttons in the screens of the list display as the specified operation.

Further, the panel control unit 10 recognizes that the specified operation is made in the list display mode based on an output of the touch panel unit 12. In accordance with this recognition as a trigger, the panel control unit 10 controls the display unit 11 to switch the screens to be displayed in the list.

<First Switching Pattern>

When the specified operation is made, the panel control unit 10 may control the display unit 11 to continuously display the reduced screens of the screen on which the specified operation is made and the higher layer screens, and to display the reduced screen of the screen corresponding to the button on which the specified operation is made instead of the reduced screen of the lower layer screen of the screen on which the specified operation is made. In addition, when the specified operation is made, the panel control unit 10 may control the display unit 11 to display the reduced screen of the screen corresponding to the button on which the specified operation is made (screen displayed when the button is operated) and reduced screens of layer screens selected so as to move toward a lower layer one by one from the corresponding screen instead of all lower layer screens of the reduced screen on which the specified operation is made.

The screen switching in this case is described with reference to FIGS. 15 and 17. FIG. 15 shows a state where four screens of the user management screen 52 (first layer), the guest permission setting screen 53 (second layer), the guest property setting screen 54 (third layer), and the use restriction setting screen 55 (fourth layer) are reduced and displayed in the list display. In other words, FIG. 15 shows a state where four higher layer screens among screens to be displayed when moving toward a lower layer one by one from the user management screen 52 to the transmission restriction setting screen 56 as the lowest layer in the normal mode are reduced and displayed in the list.

Further, FIG. 15 shows that the specified operation is made on the user list button B3 in the reduced screen of the user management screen 52 (first layer) (FIG. 15 shows an example in which the specified operation is made like a finger mark with circled 1).

Figure 17:
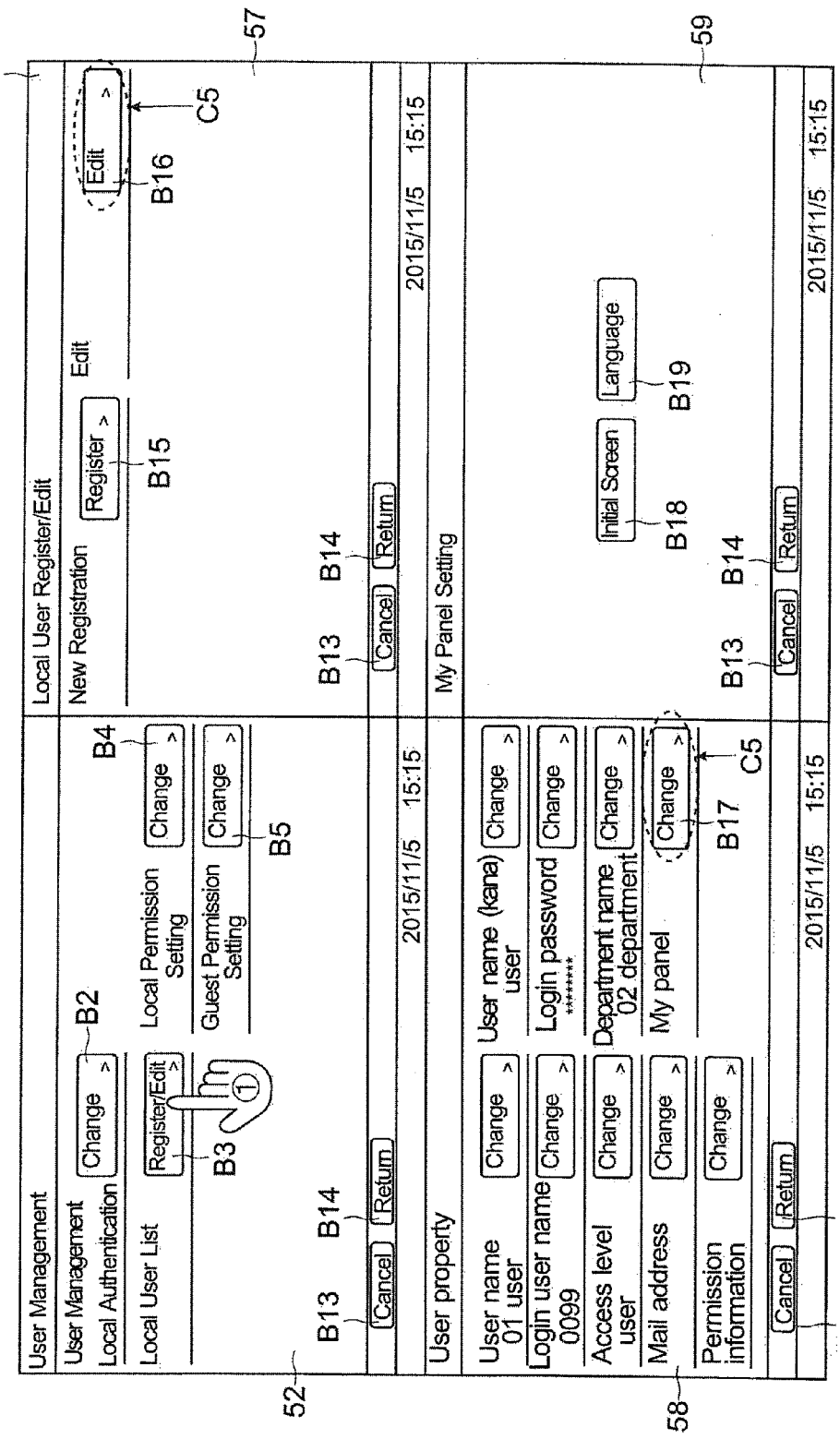
FIG. 17 is a diagram showing an example of switching by a specified operation on the list display screen of the operation panel according to this embodiment.

Further, FIG. 17 shows that a part of the screens of the list display is switched (replaced) by the specified operation.

In this display switching pattern shown in FIG. 17, the panel control unit 10 controls the display unit 11 to continuously display the higher layer reduced screen (the first layer user management screen 52) of the reduced screen on which the specified operation is made. On the other hand, the panel control unit 10 controls the display unit 11 to display the reduced screen of the screen corresponding to the button on which the specified operation is made (the register/edit screen 57), instead of the reduced screens of the lower layer screens of the reduced screen on which the specified operation is made (the guest permission setting screen 53, the guest property setting screen 54, and the use restriction setting screen 55). In this way, a button (set item) on the way (process) of moving toward a lower layer can be selected. Further, the screen corresponding to the selected button (the next lower layer screen of the selected button) can be displayed. Therefore, the user can readily check which screen belongs to other branch of the path.

Further, FIG. 17 shows an example in which the panel control unit 10 controls the display unit 11 to perform the list display of the reduced screens of the screen corresponding to the button on which the specified operation is made (register/edit screen 57) and the layer screens selected so as to move toward a lower layer one by one from the corresponding screen (the user property setting screen 58 and the my panel setting screen 59), instead of the lower layer screens of the reduced screen on which the specified operation is made. In this way, it is possible to newly display one or more screens that can be displayed after operating the button of the specified operation instead of the screens (path) that are automatically selected in accordance with the first operation. Therefore, the user can check in detail which screens belong to other branch of the path.

In this way, also in the case where the specified operation is made so as to switch the screens to be displayed in the list, the panel control unit 10 selects the next lower layer screen corresponding to the button on which the specified operation is made and screens on the path for moving toward a lower layer one by one from the corresponding screen. Further, the panel control unit 10 controls the display unit 11 to newly perform the list display of the reduced screens of the newly selected screen in order from the highest layer screen in each layer screen. Note that the screens are displayed in the list display in a predetermined arrangement from the highest layer screen also in the case where the screen is switched.

<Second Switching Pattern>

When the specified operation is made, the panel control unit 10 may select the next lower layer screen corresponding to the button on which the specified operation is made and the layer screens one by one so as to move toward a lower layer one by one from the corresponding screen, instead of all the reduced screens (screens thereof) that were displayed before the specified operation, and may perform the list display of the reduced screens of the selected screens.

Figure 18:
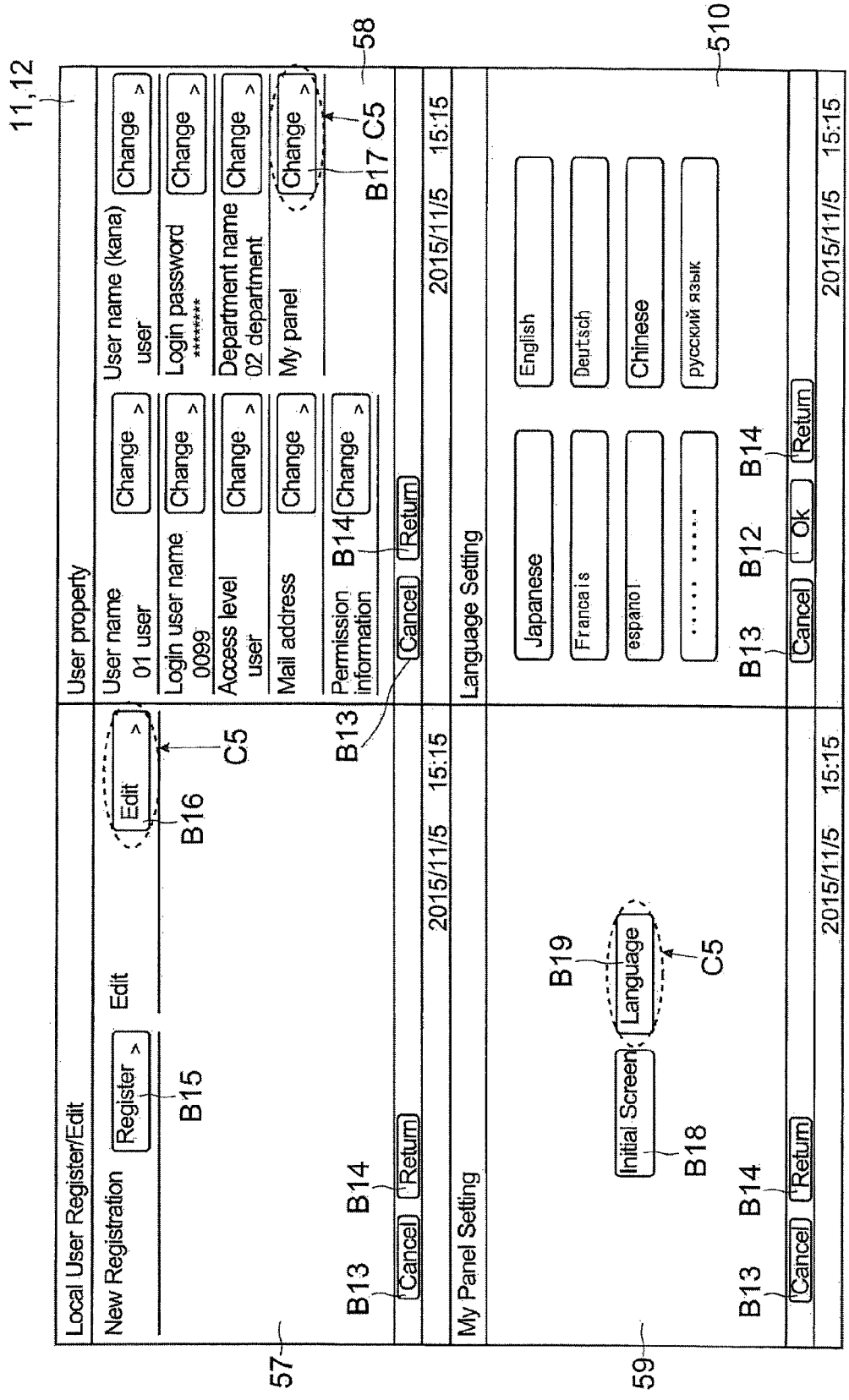
FIG. 18 is a diagram showing an example of switching by a specified operation on the list display screen of the operation panel according to this embodiment.

In this case, switching of the screens in the list display is described with reference to FIGS. 15 and 18. FIG. 18 shows an example in which all the reduced screens are switched when the specified operation is made on the user list button B3 in the reduced screen of the user management screen 52 (first layer) shown in FIG. 15.

Unlike the first switching pattern, in the second switching pattern, when the specified operation is made, the panel control unit 10 controls to delete all the reduced screens that were displayed until the specified operation is made (four screens of the user management screen 52, the guest permission setting screen 53, the guest property setting screen 54, and the use restriction setting screen 55).

On the other hand, the panel control unit 10 controls to perform the list display of the reduced screens of the screen corresponding to the button on which the specified operation is made (the associated screen, the register/edit screen 57) and the layer screens selected so as to move toward a lower layer one by one from the corresponding screen (the user property setting screen 58, the my panel setting screen 59, and the language setting screen 510) (see FIG. 18).

In this way, in the second switching pattern, the touch panel unit 12 first accepts the specified operation (on a button included in one of the reduced screens in the list display) in the list display mode. Further, the panel control unit 10 selects the screen corresponding to the button on which the specified operation is made and screens on the path for moving toward a lower layer one by one from the corresponding screen.

Further, the panel control unit 10 controls the display unit 11 to perform the list display of the reduced screens of the newly selected screen in order from the highest layer screen instead of all the currently displayed reduced screens. In this way, the display contents are switched. Note that the screens are displayed in the list in a predetermined arrangement from the highest layer screen also in this case. In this way, it is possible to newly display one or more layer screens selected so as to move toward a lower layer one by one from the screen corresponding to the button on which the specified operation is made (the next lower layer screen of the selected button), instead of the screens (path) selected automatically in accordance with the first operation. Therefore, the user can check which screens belong to other branch of the path.

Further, in either case of using the first switching pattern or the second switching pattern, the path to be traced (the screens to be selected) is the same as in the case where the first operation is made.

The screen should be switched in accordance with the specified button by one of methods of the first switching pattern and the second switching pattern. In addition, as shown in FIG. 16, it is possible to adopt a structure in which the switching pattern of the reduced image can be set in advance in the list display setting screen 511 (or other setting screen).

Further, the list display setting screen 511 is provided with a fourth button B23 (bearing a character string "part is not switched") and a fifth button B24 (bearing a character string "all are switched").

The fourth button B23 is operated when a part of the screens of the list display is switched by the first switching pattern. The fifth button B24 is operated when all the screens of the list display are switched by the second switching pattern.

Further, the reduced screen can be switched (replaced) again by making the specified operation again in the state where a new screen is displayed by the specified operation so that the reduced screen is switched (replaced). In other words, the switching (replacing) of the reduced screen can be repeated.

Further, with reference to FIG. 15 and FIG. 19, there is described a case where the specified operation is made on the button corresponding to the screen along the path that is currently select.

In order to explain this point, FIG. 15 shows that the specified operation is made on the guest property button B7 in the reduced screen of the guest permission setting screen 53 (in the second layer) (FIG. 15 shows an example in which the specified operation is made like a finger mark with circled 2).

Here, in the state shown in FIG. 15, the reduced screen of the guest property setting screen 54, which is the screen to be displayed when the guest property button B7 is operated in the guest permission setting screen 53 (i.e., the next lower layer screen of the guest permission setting screen 53) is already included in the screen to be list displayed.

Therefore, when the specified operation is made on the guest property button B7 in the list display as shown in FIG. 15, there is no change in the screen in the first switching pattern (for displaying reduced screens of the screen on which the specified operation is made and higher layer screens as they are on the display unit 11).

Therefore, as shown in FIG. 19, when the specified operation is made on the button corresponding to the screen that is already displayed among the buttons to be displayed in the list display mode, all the screens of the list display may be switched in the second switching pattern.

(Setting of Set Value when Reaching Lowest Layer)

Next, with reference to FIG. 19, there is described setting of a set value when the reduced screen of the screen for setting a set value is list displayed.

In the list display screen shown in FIG. 19, the lowest layer screen (the lower left screen) is included. The lowest layer screen is the transmission restriction setting screen 56, in which it is possible to set whether or not to perform the transmission restriction as a set value.

Here, the touch panel unit 12 accepts the operation for setting a set value (predetermined set value setting operation) when the reduced screen of the screen for setting a set value as the lowest layer screen is displayed in the list display (in the list display mode).

The operation panel 1 (touch panel unit 12) according to this embodiment accepts an operation of touching a display area of the OK button B12 disposed in the screen after touching a display area of a button for setting a set value disposed in the reduced screen of the setting screen for a set value (the lowest layer screen) as the set value setting operation. Further, when recognizing that the set value setting operation is made based on an output of the touch panel unit 12 in the list display mode, the panel control unit 10 recognizes that the set value is set. Further, the panel control unit 10 controls the memory 18 or the storage unit 42 to store the set value so as to update the setting. In this way, it is possible to set a set value also in the list display mode.

(Finishing of List Display Mode)

Next, finishing of the list display mode (list display) is described.

When the touch panel unit 12 accepts a predetermined finishing operation, the panel control unit 10 controls the display unit 11 to finish the list display mode (list display).

Here, the finishing operation can be determined appropriately. In the operation panel 1 according to this embodiment, it is a condition for maintaining the list display mode to keep touching of at least one point from the first operation. Further, an operation of taking all fingers off the touch panel unit 12 (release of all touch points) is regarded as the finishing operation. Note that it is possible to regard an operation of touching an additional point in an area other than the button in the reduced screens continuously for a certain period (long pressing operation of two touch points) as the finishing operation.

In addition, it is possible not to regard the operation of keeping to touch at least one point from the first operation as the condition for maintaining the list display mode (so as to permit to take a finger off). In this case, the operation of touching one or two points in an area other than the button in the reduced screens in the list display is regarded as the finishing operation. Further, the finishing operation is not limited to the example described above and can be appropriately determined to be an operation of moving a touch position in a specific direction, a three-point touch operation, or the like.

When the operation defined as the finishing operation is made, the panel control unit 10 recognizes that the finishing operation is made based on an output of the touch panel unit 12. When recognizing the finishing operation, the panel control unit 10 controls the display unit 11 to finish the list display mode (list display). In other words, the operation panel 1 (display unit 11 and the touch panel unit 12) returns to the normal mode in which only one type of screen is displayed, and returns to the mode for switching the screen when one of buttons is operated.

Further, when the finishing operation is made (when the list display mode is finished), the panel control unit 10 may control to display the screen on which the first operation is made (the screen on which the list display is started). In this way, the original layer screen can be displayed directly after the list display. In other words, when the list display mode is finished by the finishing operation, it is possible to directly return to the screen on which the first operation is made.

In addition, when the finishing operation is made (when the list display mode is finished to return to the normal mode), the panel control unit 10 may control the display unit 11 to display one of the reduced screens in the list display by restoring the original size of the reduced screen. In other words, the reduced screen displayed at the touch position when the finishing operation is made may be enlarged and displayed to return to the normal mode. In this way, it is possible to jump from the screen on which the first operation is first made to a different layer screen. In addition, it is possible to return to the normal mode in the state where a screen in the list display is display.

In addition, the image forming apparatus (multifunction peripheral 100) includes the display input device (operation panel 1) described above. Therefore, it is possible to provide the image forming apparatus, in which screens belonging to lower layers can be easily checked, and screens displayed in operation and the hierarchical structure of the screen can be easily checked.

What is claimed is:

1. A display input device comprising:
   a display unit configured to display setting screens in a tree-like hierarchical structure, to display a button in each setting screen and to switch a setting screen to be displayed from a setting screen that is currently displayed to one of a lower layer setting screen and a higher layer setting screen in accordance with a button that is operated in a normal mode; and
   a touch panel unit for accepting an operation on the setting screen of the display unit and for accepting an operation on the button displayed on the display unit, wherein
   when the touch panel unit accepts a predetermined first operation, the display unit starts a display in a list display mode, in which the display unit divides an entire display area into a predetermined number of areas and reduced screens are displayed in the divided areas respectively in a list display in order from the higher layer setting screen, the reduced screens being setting screens reduced to be smaller than a setting screen in the normal mode to fit within the divided areas respectively and being selected so as to move toward a lower layer one by one from a next lower layer setting screen of the setting screen on which the first operation is made.

2. The display input device according to claim 1, wherein the touch panel unit accepts an operation of long pressing one of buttons displayed in the setting screen as the first operation in the normal mode, and
   in the list display mode, the display unit performs the list display of reduced screens of layer setting screens, which are selected so as to move toward a lower layer one by one from a first layer setting screen that is a setting screen corresponding to the button on which the first operation is made.

3. The display input device according to claim 1, wherein the touch panel unit accepts a specified operation that is an operation on a button included in one of the reduced screens of the list display in the list display mode, and
   when the specified operation is made, the display unit displays the reduced screen on which the specified operation is made and the reduced screen of a higher layer setting screen as they are, and displays the reduced screen of the setting screen corresponding to the button on which the specified operation is made instead of the reduced screen of a lower layer setting screen of the reduced screen on which the specified operation is made.

4. The display input device according to claim 3, wherein when the specified operation is made, the display unit displays the reduced screen of the setting screen corresponding to the button on which the specified operation is made and the reduced screens of layer setting screens selected so as to move toward a lower layer one by one from the corresponding setting screen instead of all the reduced screens of lower layers of the reduced screen on which the specified operation is made.

5. The display input device according to claim 1, wherein the touch panel unit accepts a specified operation that is an operation on a button included in one of the reduced screens of the list display in the list display mode, and when the specified operation is made, the display unit performs the list display of the reduced screen of the setting screen corresponding to the button on which the specified operation is made and the reduced screens of layer setting screens selected so as to move toward a lower layer from the corresponding setting screen instead of all the reduced screens that are displayed before the specified operation.

6. The display input device according to claim 1, wherein the display unit performs the list display of the reduced screens in a predetermined arrangement order of layers in the list display mode.

7. The display input device according to claim 1, wherein the display unit performs the list display of the reduced screens of setting screens on a process of moving toward a lower layer one by one in a predetermined path with respect to the button on which the first operation is made, or performs the list display of the reduced screens of setting screens on the process of moving toward a lower layer one by one by regarding that an operation is made on a button at a predetermined position in the setting screen, or performs the list display of the reduced screens of setting screens on the process of moving toward a lower layer one by one so as to reach a deepest layer setting screen from the setting screen corresponding to the button on which the first operation is made.

8. The display input device according to claim 1, wherein when the touch panel unit accepts a predetermined finishing operation, the display unit finishes the list display mode and returns to the normal mode so as to display the setting screen on which the first operation is made.

9. The display input device according to claim 1, wherein the touch panel unit accepts a predetermined finishing operation, the display unit finishes the list display mode and returns to the normal mode so as to display a normal size setting screen of one of the reduced screens of the list display.

10. The display input device according to claim 1, wherein the touch panel unit accepts an operation of touching a display area of an OK button disposed in the setting screen after touching a display area of a button for setting a set value disposed in the reduced screen of a setting screen for setting a set value as an operation of setting a set value.

11. An image forming apparatus comprising the display input device according to claim 1.

12. A method for controlling a display input device, the method comprising the steps of:

displaying setting screens in a tree-like hierarchical structure;

displaying a button in a setting screen;

switching a setting screen to be displayed from a setting screen that is currently displayed to one of a lower layer setting screen and a higher layer setting screen in accordance with a button that is operated in a normal mode;

accepting an operation on the displayed setting screen;

accepting an operation on a displayed button;

starting a display in a list display mode when accepting a predetermined first operation;

dividing an entire display area into a predetermined number of areas; and displaying reduced screens in the divided areas respectively in a list display in order from the higher layer setting screen, is the reduced screens being setting screens reduced to be smaller than a setting screen in the normal mode to fit within the divided areas respectively and being selected so as to move toward a lower layer one by one from a next lower layer setting screen of the setting screen on which the first operation is made.

* * * * *